Jan. 16, 1923.

G. E. TUCKER.
AUTOMOBILE ROBE LOCK.
FILED JUNE 7, 1922.

Inventor.
George E. Tucker
By Knight Bro
Attorneys.

Jan. 16, 1923. 1,442,750
G. E. TUCKER.
AUTOMOBILE ROBE LOCK.
FILED JUNE 7, 1922.
2 SHEETS-SHEET 2
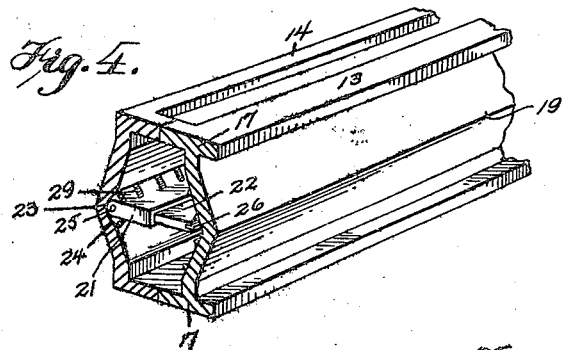
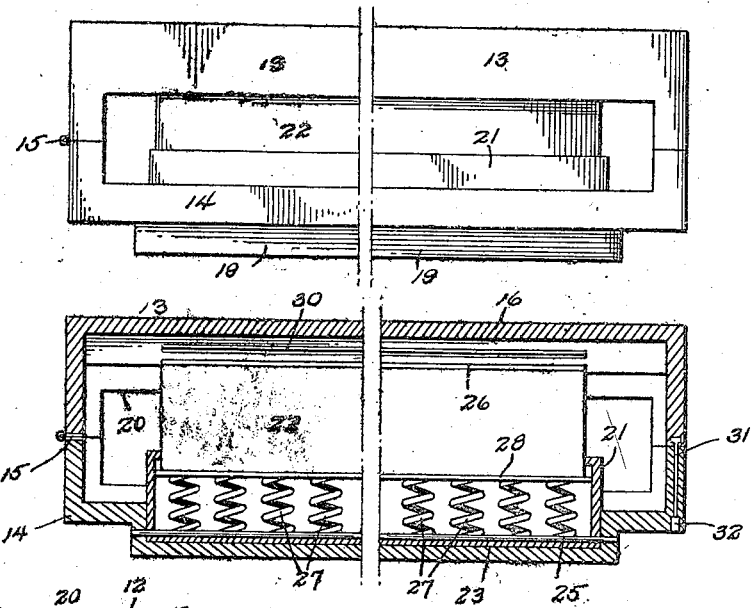
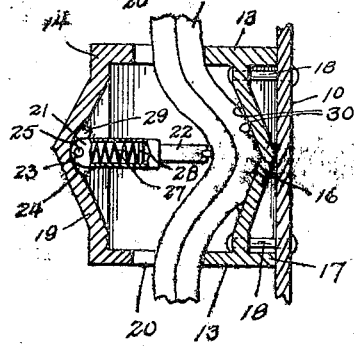
Inventor.
George E. Tucker,
By Knight Bros.
Attorneys.

Patented Jan. 16, 1923.

1,442,750

UNITED STATES PATENT OFFICE.

GEORGE E. TUCKER, OF WASHINGTON, DISTRICT OF COLUMBIA.

AUTOMOBILE ROBE LOCK.

Application filed June 7, 1922. Serial No. 566,645.

*To all whom it may concern:*

Be it known that I, GEORGE E. TUCKER, a citizen of the United States, and a resident of Washington, in the District of Columbia, have invented certain new and useful Improvements in Automobile Robe Locks, of which the following is a specification.

This invention relates to automobile robe locks and has for its particular object to provide a construction of this type which will efficiently and positively prevent unauthorized removal of automobile robes when left by the owner.

It is customary to provide on the back of the front seat of an automobile a robe rail over which the robes are placed in a folded condition. Obviously, however, no protection is afforded and valuable robes are ofttimes stolen. Therefore it is the primary object of this invention to provide a locking means which may be attached to machines at a point adjacent the robe rail and by which the robe or robes may be positively locked and their unauthorized removal prevented.

Another feature of the invention resides in its construction whereby the locking device may be quickly and conveniently attached to cars already on the market without in any way disrupting or mutilating the appearance of the machine. Obviously therefore this invention may be sold as an accessory and applied by the owner of a machine, its construction being such that it cooperates with equal facility and efficiency with all of the types of robe rails now generally employed.

Another feature of this invention resides in the manner in which the arrangement is attached to the car whereby it is necessary that the locking device be in its unlocked position before access may be had to the attaching bolts. This construction renders the device absolutely thief-proof.

Another feature of this invention resides in the peculiar construction whereby the attempted withdrawal of a robe when the device is in locked position tends to wedge the robe between the locking members and thereby positively prevent its removal.

The invention furthermore consists in the novel construction and arrangement of parts hereafter more fully described and illustrated in the accompanying drawings.

In the drawings:

Fig. 4 is a fragmentary perspective view, partly in section,

Fig. 5 is a top plan view of the device,

Fig. 6 is a horizontal section, and,

Fig. 7 is a vertical transverse section through the locking member.

Figure 1:
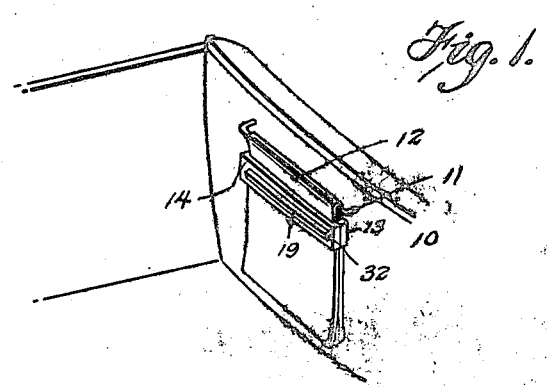
Fig. 1 is a perspective view of the device attached to an automobile.

Referring now more particularly to the drawings wherein like reference characters indicate like parts, it will be seen that there is illustrated a motor vehicle 10 provided with the usual robe rail 11 upon which there is hung in a folded condition a robe 12.

The locking device comprises a pair of members hinged at one side and adapted to be open on its hinged connection. The locking member is adapted to be preferably secured to the rear of the front seat immediately adjacent the robe rail 11 such as is illustrated in Fig. 1. The locking device comprises a casing 13 which is adapted to be secured to the machine and a second casing 14 connected thereto. The connection between the casings 13 and 14 is accomplished by one or more hinges 15, secured to the adjacent edges 13 and 14 and housed and concealed by the casings when in their closed position.

The casing 13 as mentioned hereinbefore, is adapted to be secured to the rear of the front seat of the automobile 10. The vertical wall 16 of this casing is preferably angular as illustrated clearly in Fig. 7 and in order to provide a flush bearing surface the side walls of the casing 13 are provided with extensions 17, the edges of which are in a plane with the apex of the angular wall 16. Bolts, rivets, screws or the like pass through apertures formed in the casing 13 and are secured to the rear of the front seat of the vehicle. It should be noted that in order to attach the device the same must be in open position so that access may be had to the securing means 18. Therefore when the locking device is in closed position the unauthorized removal of the attaching means 18 is prevented.

The hinged section 14 of the casing is also provided with an angular vertical wall 19 corresponding to the angular wall 16 of the casing section 13. The adjacent edges of the casing sections 13 and 14 are cut away as indicated at 20 thereby providing an opening through which the robe 12 is adapted to extend. Obviously the size of this opening may be varied in accordance with the requirements of each particular case, but these openings are preferably of sufficient width to accommodate one or two robes in a folded condition.

The casing section 14 has mounted in the apex of this angular wall a locking bar comprising a main section 21 and a telescoping section 22. The main section 21 is provided with a rounded surface 23 adapted to rest in a curved recess 24 formed in the wall 19 of the casing 14. For securing this bar 21 in place there is provided a longitudinally extending bolt 25 suitably anchored at each end. This connection between the casing 14 and the locking bar section 21 permits of a swinging movement of this bar such as suggested by dotted lines in Fig. 3. The telescoping section 22 of the locking bar carries an insert 26 at its edge which may be serrated or otherwise formed so as to engage the robe 12 to positively hold the same when an unauthorized attempt is made to withdraw the same. The telescoping section 22 is urged outwardly by a plurality of coil springs 27 disposed in the section 21 of the locking bar. The telescoping section 22 is provided with lips 28 to prevent the same from being forced out of the section 21.

Figure 3:
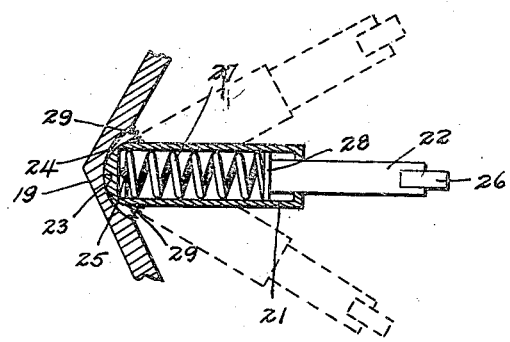
Fig. 3 is a fragmentary cross-sectional view of one part of the locking device.

For maintaining the locking bar 21—22 normally in the position shown in full lines in Fig. 3, there is provided a plurality of small coil springs 29 suitably secured to the casing 14 and engaging the section 21 of the locking bar adjacent its base. Inasmuch as these springs are located on both sides of the connecting bar 25 and are of equal strength, the locking bar is maintained in an extended approximately horizontal position. In this position the locking bar is directed toward the apex of the angular wheel 16 of the casing section 13.

Cooperating with the insert 26 of the locking bar are a plurality of teeth 30 formed on the adjacent face of the casing section 13. As will be apparent from an examination of Fig. 7, the robe 12 is constantly urged toward these teeth by the locking bar 21—22. If an effort is made to withdraw the robe with the device in locked position, the locking device 21—22 will be swung either upwardly or downwardly, such as suggested by dotted lines in Fig. 3 whereupon, owing to the angular wall 16, a wedging action will occur, the said parts thereupon binding and clamping the robe between the locking bar and the casing section 13. This action is furthermore assured because of the tortuous or serpentine path of the robe through the locking device which is clearly illustrated in Fig. 7.

For locking the two casing sections together, a suitable lock 31 is provided which lock may be actuated through a key-hole 32. The lock illustrated in only suggestive of a key actuated lock and obviously any suitable type of locking mechanism may be employed.

Figure 2:
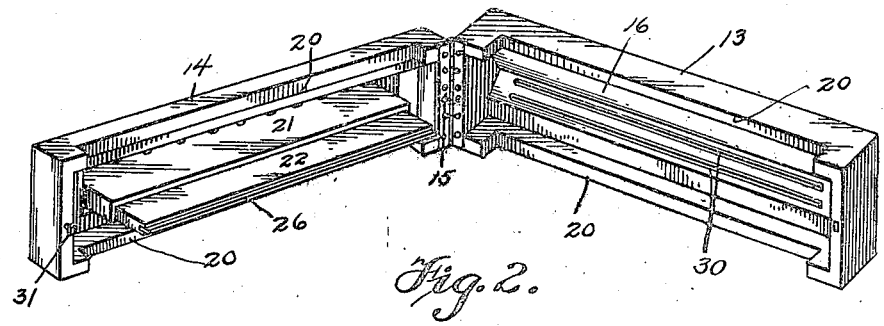
Fig. 2 is a perspective view of the locking device in open position.

In attaching the device, the casing section 14 is unlocked and swung to the position illustrated in Fig. 2 whereupon access may be had to the apertures through which the attaching screws or bolts 18 are adapted to pass. The locking device may thereupon be secured to the rear of the front seat and positioned preferably immediately below the robe rail 11 as illustrated in Fig. 1.

When it is desired to lock one or more robes, the same are folded and hung upon the robe rail in the manner illustrated also in Fig. 1, the folds of the robe extending downwardly past the locking device and in position to pass through the openings 20 when the device is in closed position. The casing section 14 is thereupon swung to its closed position, the locking bar 21—22 thereupon engaging the robe and pressing the same against the wall 16 of the casing section 13 and in engagement with the teeth 30. Obviously the telescoping locking bar 21—22 will accommodate itself to robes of varying thicknesses and also will enable more than one robe to be locked; in this event the telescoping bar 22 is permitted to recede by reason of the spring 27.

The casing section 14 having been locked the unauthorized removal of the robes is prevented. Should an attempt be made to withdraw any of the robes from off the robe rail 11 this action will be resisted by the locking bar 21—22 and the teeth section of the casing 13. A pull exerted upon the robe 12 will cause the locking bar 21—22 to move either upwardly or downwardly as indicated by dotted lines in Fig. 3 and because of the angular formation of the wall 16, a wedging action will take place between the locking bar and the casing section 13. The removal of the robe will therefore be positively prevented. When the casing members are unlocked and opened, the springs 29 will return the locking bar to its normal horizontal position and the springs 27 will also move the telescoping section 22 of the locking bar to its extended position.

From the foregoing it will be obvious that there is provided a robe rail lock which may be quickly and conveniently secured to the machines now in use and furthermore, that the attaching means are inaccessible except when the device is unlocked. This eliminates the objection to robe rail locks now employed wherein the attaching screws or bolts may at any time be removed and the locking device taken away inasmuch as the securing bolts are, in known types of robe rail locks always accessible. It will also be obvious that the locking device hereinbefore described is so constructed as to be able to accommodate robes of varying thicknesses and also varying numbers of robes. The arrangement of parts is such that the device may be cheaply and durably manufactured and the result sought to be obtained efficiently accomplished.

While the details of construction herein illustrated and described are efficient in every respect, it is not intended that this invention be unnecessarily limited, but reservation is made to make such changes as may come within the purview of the accompanying claims.

Having thus described my invention, what I claim is:

1. In a robe lock of the class described a sectional casing provided with aligned openings through which the robe is adapted to pass, a hinged connection between the sections of said casing, a locking telescoping bar mounted within one section of said casing, springs tending to normally maintain said telescoping bar in extended position, means accessible when said casing is open for securing one section thereof to a support, said locking bar being adapted in the closed position of said casing to engage a robe for locking the same to said casing and means for locking the casing sections together.

2. The combination with a robe rail and a robe of a locking device comprising a pair of casing sections hingedly united, said casing sections being formed with registering openings in their upper and lower walls to permit the passage of the robe therethrough, each casing section being formed with an angular wall, one of said walls being provided with teeth, a swinging locking bar mounted on the other angular wall and extending toward said teeth, said locking bar being formed of a pair of telescoping sections, spring means urging said sections apart, said locking bar being adapted to cause said robe to engage said teeth, the withdrawal of said robe causing said locking bar to swing to wedge said robe between said locking bar and the angular wall carrying said teeth and means for locking said casing sections in closed position.

3. The combination with a robe rail and a robe of a locking device comprising a pair of casing sections hingedly united, said casing sections being formed with registering openings in their upper and lower walls to permit the passage of the robe therethrough, each casing section being formed with an angular wall, one of said walls being provided with teeth, a swinging locking bar mounted on the other angular wall and extending toward said teeth, said locking bar being adapted to cause said robe to engage said teeth, the withdrawal of said robe causing said locking bar to swing to wedge said robe between said locking bar and the angular wall carrying said teeth and means accessible when said casing sections are open for attaching one of said casing sections to a support and means for locking said casing sections in closed position.

4. In a robe lock of the class described, a sectional casing, said sections being hingedly united, means securing one of said sections to a support, the fixed section of said casing being formed with an angular wall providing robe engaging means and a locking bar for urging the robes toward said robe engaging means, means pivotally securing said locking bar to the movable casing section, resilient means tending to maintain said locking bar in a relatively central position, said locking bar comprising a pair of telescoping sections and spring means tending to normally maintain said telescoping sections in extended position and means for locking said sections together.

5. The combination with a robe rail adapted to support a robe of a locking device comprising a casing formed of a pair of hingedly united sections, said casing being formed with a pair of aligned openings through which the folded robe is adapted to pass, means carried by said casing sections for preventing the withdrawal of said robe and means accessible when said casing is open for securing one section thereof to a support and means for locking said sections together.

6. The combination with a robe rail adapted to receive a robe of a locking device arranged adjacent said robe rail, said locking device comprising a casing formed of a pair of hingedly united sections, said casing being formed with aligned openings to permit the passage of the folded robe through said casing, one of said casing sections being formed with a pair of inclined walls, a locking bar swingingly mounted on the other casing wall and projecting toward the juncture point of said inclined walls whereby the unauthorized withdrawal of said robe will cause the same to be wedged between said locking bar and one of said inclined walls and means for locking said sections together.

GEORGE E. TUCKER.